United States Patent [19]
Sibley

[11] 3,785,688
[45] Jan. 15, 1974

[54] VEHICLE BUMPER
[75] Inventor: Louis F. Sibley, Ware, Mass.
[73] Assignee: Gillespie Corp., Ware, Mass. ; a part interest
[22] Filed: Aug. 18, 1972
[21] Appl. No.: 281,832

[52] U.S. Cl..................... 293/62, 180/5 R, 293/64, 293/71 R, 293/72
[51] Int. Cl... B60r 19/08, B61f 19/04, B62m 27/00
[58] Field of Search...................... 293/64, 69 R, 62, 293/71 R, 72; 180/5 R

[56] References Cited
UNITED STATES PATENTS

| | | | |
|---|---|---|---|
| 1,611,156 | 12/1926 | Borrensen | 293/72 |
| 2,282,201 | 5/1942 | Neuman | 293/71 R X |
| 1,776,165 | 9/1930 | Scalpelli | 293/72 |
| 1,457,259 | 5/1923 | Malluk et al. | 293/62 |
| 1,486,925 | 3/1924 | Scalpelli | 293/72 |
| 1,642,281 | 9/1927 | Weiss | 293/72 |
| 1,701,308 | 2/1929 | Rosenberg | 293/72 |
| 1,710,175 | 4/1929 | Mascuch | 293/72 |

Primary Examiner—Gerald M. Forlenza
Assistant Examiner—Howard Beltran
Attorney—Ross, Ross & Flavin

[57] ABSTRACT

A resilient bumper for a vehicle such as a snow mobile, wherein a pair of superposed coil springs is disposed at the forward end of the vehicle, each spring being wrapped with a high-impact plastic covering, the lower spring extending forwardly from the forward end of the vehicle and along the sides of the vehicle, and the upper spring extending forwardly from the vehicle, spaced end brackets being fixed to the sides of the vehicle to which the ends of the springs are anchored, with certain of the brackets being common to both springs, wherefore the springs function unisonly.

2 Claims, 5 Drawing Figures

PATENTED JAN 15 1974 3,785,688

VEHICLE BUMPER

The invention relates to a rugged bumper which may be quickly and easily attached to vehicles of virtually all types.

The bumper includes a pair of coil springs for protecting not only the front, but also the sides of the vehicle.

A primary object of the invention is to provide a novel system of brackets for linking a pair of coil springs so that they form an integral bumper while anchoring the springs to the vehicle.

These and other objects will become readily apparent from a consideration of the annexed drawings, in which.

Figure 1:
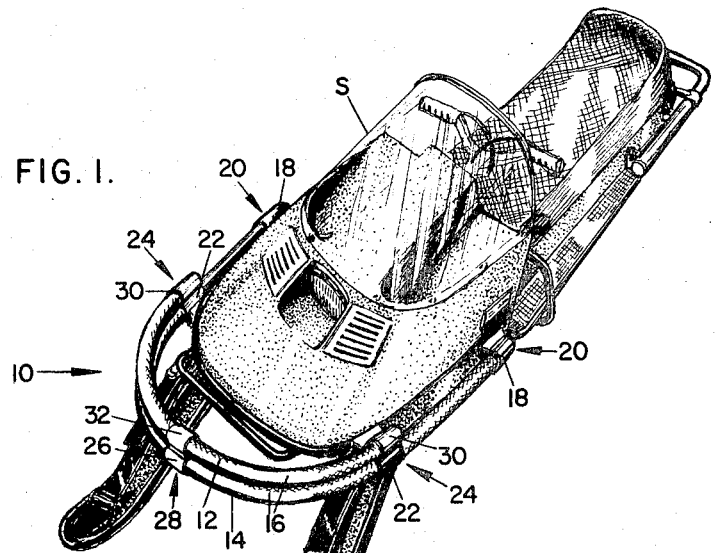
FIG. 1 is a perspective view of a vehicle bumper embodying a preferred form of the invention and attached to a snow mobile.
Figure 2:
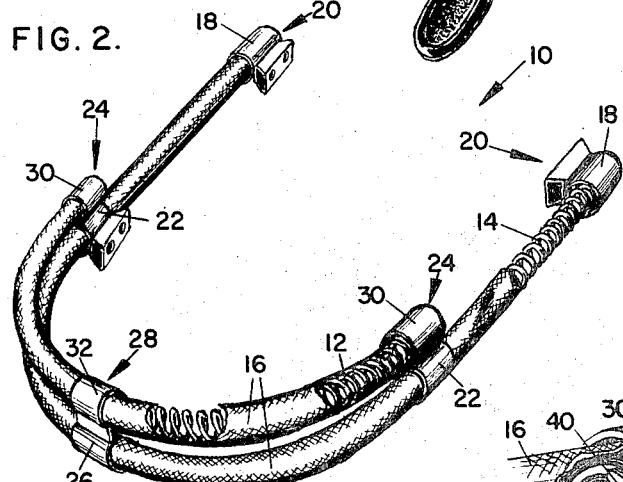
FIG. 2 is an enlarged perspective view of the bumper of FIG. 1 with parts broken away.

As shown in FIG. 1, a vehicle bumper embodying a preferred form of the invention is generally indicated by 10 and is disposed at the forward end of a snow mobile S, shown for illustrative purposes only, it being understood that the bumper hereof may be utilized with other vehicles.

The bumper includes a pair of upper and lower U-shaped superposed, shock-absorbing coil springs 12 and 14 respectively which extend around the forward end of the snow mobile, with the lower coil spring additionally extending along the sides of the snow mobile.

Each spring is sleeved by a high-impact plastic covering 16.

The ends of the lower spring are anchored in cylindrical sleeves 18 provided on rear brackets generally indicated by 20 fixed to the sides of the snow mobile.

The lower spring additionally passes freely through lower cylindrical sleeves 22 provided on a pair of front brackets generally indicated by 24 and fixed to the snow mobile adjacent its forward end at each side thereof forwardly of rear brackets 20.

The lower spring is spaced from the forward end of the snow mobile and additionally passes freely through a lower cylindrical sleeve 26 of a guide member generally indicated by 28.

The ends of upper spring 12 are anchored in upper cylindrical sleeves 30 fixed to and disposed upwardly of lower cylindrical sleeves 22 of front brackets 24.

The upper spring is spaced from the forward end of the snow mobile and additionally passes freely through an upper cylindrical sleeve 32 fixed to and disposed upwardly of lower sleeve 26 of guide member 28.

In this manner, the springs are not fixed to the forward end per se of the snow mobile, only to the sides, wherefore they are free to flex.

Figure 3:
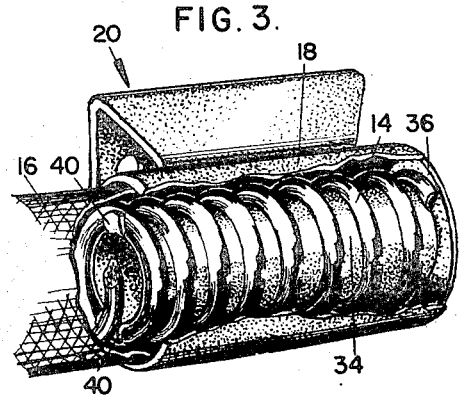
FIG. 3 is a greatly enlarged, fragmentary perspective view of one of the rear brackets of the bumper, with parts broken away.
Figure 5:
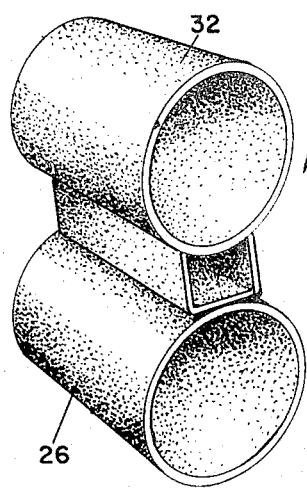
FIG. 5 is a perspective view of the guide member of the bumper.
Figure 4:
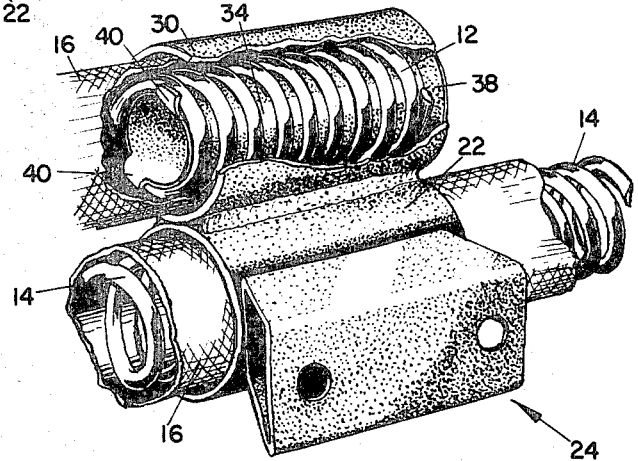
FIG. 4 is a view similar to FIG. 3 of one of the front brackets of the bumper, with parts broken away.

The ends of the upper and lower springs are secured in their respective brackets by means of locking members 34, (see FIGS. 3 and 4).

In the case of lower spring 14, the locking members are circumscribed by sleeves 18 and extend inwardly from a rear wall 36 of each sleeve interiorly of the spring.

In the case of upper spring 12, the locking members are circumscribed by sleeves 30 and extend inwardly from a rear wall 38 of each sleeve interiorly of the spring.

A pair of locking ears 40 is provided on the inner ends of each locking member 34, wherefore the ends of the springs may be screwed onto the locking members to firmly anchor the springs.

The bumper construction provides rugged protection for the vehicle and for its driver.

The plastic covering may be wrapped with fluorescent tape for additional safety in night driving.

The bumper may be quickly and easily installed either as original equipment or on older vehicles.

The plastic coverings protect the springs and add strength to the structure.

A pair of superposed U-shaped bumpers is provided to protect not only the front but the sides of the vehicle.

By means of the novel system of brackets, the springs function unisonly.

I claim:

1. A vehicle bumper comprising, a pair of superposed coil springs extending forwardly from the vehicle, the springs being U-shaped in plan with one of the springs being of greater length than the other and extending rearwardly from the other along the sides of the vehicle, means for fixing the springs to the vehicle and for linking the springs to each other for functioning unisonly comprising, pairs of spaced brackets fixed to the vehicle at each side thereof, and a guide member disposed forwardly of the vehicle, the longer spring being fixed at its ends to one pair of brackets and the shorter spring being fixed at its ends to the other pair of brackets, the longer spring passing freely through said last named pair of brackets, and both springs passing freely through the guide member.

2. A vehicle bumper according to claim 1, including high-impact plastic covering enwrapping each spring.

* * * * *